(12) United States Patent
Ramachandra Iyer et al.

(10) Patent No.: US 11,010,180 B2
(45) Date of Patent: May 18, 2021

(54) METHOD AND SYSTEM FOR PROVIDING REAL-TIME GUIDANCE TO USERS DURING TROUBLESHOOTING OF DEVICES

(71) Applicant: WIPRO LIMITED, Bangalore (IN)

(72) Inventors: Manjunath Ramachandra Iyer, Bangalore (IN); Meenakshi Sundaram Murugeshan, Bangalore (IN)

(73) Assignee: Wipro Limited, Bangalore (IN)

( * ) Notice: Subject to any disclaimer, the term of this patent is extended or adjusted under 35 U.S.C. 154(b) by 283 days.

(21) Appl. No.: 16/036,968

(22) Filed: Jul. 17, 2018

(65) Prior Publication Data
US 2019/0370035 A1 Dec. 5, 2019

(30) Foreign Application Priority Data
May 29, 2018 (IN) .............................. 201841020108

(51) Int. Cl.
*G06F 9/451* (2018.01)
*H04L 29/08* (2006.01)
(Continued)

(52) U.S. Cl.
CPC ............ *G06F 9/453* (2018.02); *G06F 3/0488* (2013.01); *G06F 3/167* (2013.01); *H04L 67/22* (2013.01); *G06Q 30/016* (2013.01)

(58) Field of Classification Search
CPC ........ G06F 40/205; G06F 40/30; G06F 40/35; G06F 40/211; G06F 16/3329;
(Continued)

(56) References Cited

U.S. PATENT DOCUMENTS 6,397,174 B1 * 5/2002 Poznanski ............. G06F 40/284
704/9
6,973,620 B2 * 12/2005 Gusler .................... G06F 9/453
715/708
(Continued)

OTHER PUBLICATIONS

16036968 EIC 3600 Search Report 122920 (Year: 2020).*
(Continued)

*Primary Examiner* — Andrew B Whitaker
*Assistant Examiner* — Johnathan J Lindsey, III
(74) *Attorney, Agent, or Firm* — Finnegan, Henderson, Farabow, Garrett & Dunner, LLP

(57) ABSTRACT

The present disclosure discloses method and guidance providing system for providing real-time guidance to users during troubleshooting of devices. The guidance providing system receives user input indicating troubleshooting actions on device, by user, where user input comprises textual input and non-textual input, identifies object in device associated with troubleshooting actions and state of user while performing troubleshooting actions, from non-textual input. The object identified from non-textual input is mapped with textual input to obtain mapped user input. Consistency of mapped user input is verified based on conversation information and domain specific content associated with device. Sequence of instructions corresponding to mapped user input, based on state of user and one or more similar troubleshooting actions, may be extracted from knowledge database. Thereby troubleshooting instructions are provided based on sequence of instructions and one or more similar troubleshooting actions, to user for real-time guidance during troubleshooting of the device.

18 Claims, 6 Drawing Sheets

(51) Int. Cl.
*G06F 3/16* (2006.01)
*G06F 3/0488* (2013.01)
*G06Q 30/00* (2012.01)

(58) Field of Classification Search
CPC .. G06F 11/0793; G06F 40/295; G06F 3/0488; G06F 3/167; G06F 9/453; G06Q 30/016; G10L 15/22; H04L 67/22
USPC .......................................................... 705/304
See application file for complete search history.

(56) References Cited

U.S. PATENT DOCUMENTS

| | | | |
|---|---|---|---|
| 8,296,278 B2* | 10/2012 | Abraham | G06F 16/353 |
| | | | 707/705 |
| 8,418,001 B2 | 4/2013 | Knorl et al. | |
| 8,484,014 B2* | 7/2013 | Liu | G10L 15/19 |
| | | | 704/9 |
| 9,591,494 B2* | 3/2017 | Mikkelsen | H04W 4/00 |
| 10,019,716 B1* | 7/2018 | Ainslie | G06Q 30/016 |
| 10,192,551 B2* | 1/2019 | Carbune | G10L 15/16 |
| 2005/0108001 A1* | 5/2005 | Aarskog | G06F 40/289 |
| | | | 704/10 |
| 2014/0025588 A1* | 1/2014 | Chinnappa | G06Q 30/01 |
| | | | 705/304 |
| 2015/0032669 A1 | 1/2015 | Winnick | |
| 2015/0206063 A1 | 7/2015 | Sentero et al. | |
| 2015/0278195 A1* | 10/2015 | Yang | G06F 40/30 |
| | | | 704/9 |
| 2016/0274962 A1 | 9/2016 | Fortune et al. | |
| 2017/0243107 A1* | 8/2017 | Jolley | G06N 5/02 |
| 2018/0077088 A1* | 3/2018 | Cabrera-Cordon | |
| | | | H04L 67/306 |
| 2019/0251201 A1* | 8/2019 | Chigusa | G06F 16/353 |
| 2019/0317953 A1* | 10/2019 | Browarnik | G06F 16/328 |

OTHER PUBLICATIONS

Hassankashi, M., "Combination of Speech Recognition and Image Processing", ResearchGate, (2014), 6 pages.

Mandal, S., et al., "Diagnosis and Troubleshooting of Computer Faults based on Expert System and Artificial Intelligence", Academic Publications, Ltd., (2013), pp. 717-729.

\* cited by examiner

US 11,010,180 B2

METHOD AND SYSTEM FOR PROVIDING REAL-TIME GUIDANCE TO USERS DURING TROUBLESHOOTING OF DEVICES

TECHNICAL FIELD

The present subject matter is related in general to troubleshooting guidance, more particularly, but not exclusively to method and system for providing real-time guidance to users during troubleshooting of devices.

BACKGROUND

With advancement in technology, numerous devices have been designed for welfare and easement of people. Generally, most of the devices in use today are highly complicated and troubleshooting of the devices is increasingly complex as the devices include numerous components and features. The devices can be, for instance, a mobile phone, a laptop, a personal digital assistant, a wearable, or any other electronic and mechanical devices. Increase in computing power of these devices over years has led to advancement and added functionality to these devices. However, the added functionality is wasted, in case, users do not know how to use or maintain the device or are unable to locate necessary features. When the users observe any problem in the devices, it becomes essential for the user to determine how to repair the device without requiring a visit from a service technician.

Devices are designed along with troubleshooting instructions. Generally, users may try to fix the problem by following trouble shooting instructions of a manual or a remote expert. Of late, conversational systems have started to replace the experts to a larger extent. While the automated system rendering step-by-step troubleshooting instructions to the user is attractive, it comes with an array of problems. Firstly, the users may end-up in damaging the device while performing the troubleshooting steps. The user may find it difficult to follow the troubleshooting steps or the user may not be able to relate or visualize the instructions. In addition, some of the users find the trouble shooting steps too detailed and wastage of time, while the others find the details very short. Thus, there is a lack of a robust and efficient mechanism for dynamically generating troubleshooting steps, process, and wordings to suit each individual user.

The information disclosed in this background of the disclosure section is only for enhancement of understanding of the general background of the invention and should not be taken as an acknowledgement or any form of suggestion that this information forms the prior art already known to a person skilled in the art.

SUMMARY

In an embodiment, the present disclosure may relate to a method for providing real-time guidance to users during troubleshooting of devices. The method comprises receiving user input indicating troubleshooting actions on a device, by a user. The user input comprises textual input and non-textual input. The method comprises identifying an object in the device associated with the troubleshooting actions and state of the user while performing the troubleshooting actions, from the non-textual input, mapping the object, identified from the non-textual input with the textual input to obtain a mapped user input, verifying consistency of the mapped user input based on a conversation information and domain specific content associated with the device, extracting at least one of, sequence of instructions corresponding to the mapped user input, based on the state of the user and one or more similar troubleshooting actions, obtained from a knowledge database and providing troubleshooting instructions based on at least one of, the sequence of instructions and the one or more similar troubleshooting actions, to the user for real-time guidance, during troubleshooting of the device.

In an embodiment, the present disclosure may relate to a guidance providing system for providing real-time guidance to users during troubleshooting of devices. The guidance providing system may comprise a processor and a memory communicatively coupled to the processor, where the memory stores processor executable instructions, which, on execution, may cause the guidance providing system to receive user input indicating troubleshooting actions on a device, by a user. The user input comprises textual input and non-textual input. The guidance providing system identifies an object in the device associated with the troubleshooting actions and state of the user while performing the troubleshooting actions, from the non-textual input, maps the object, identified from the non-textual input with the textual input to obtain a mapped user input, verifies consistency of the mapped user input based on a conversation information and domain specific content associated with the device, extracts at least one of, sequence of instructions corresponding to the mapped user input, based on the state of the user and one or more similar troubleshooting actions, obtained from a knowledge database and provides troubleshooting instructions based on at least one of, the sequence of instructions and the one or more similar troubleshooting actions, to the user for real-time guidance, during troubleshooting of the device.

In an embodiment, the present disclosure relates to a non-transitory computer readable medium including instructions stored thereon that when processed by at least one processor may cause a guidance providing system to receive user input indicating troubleshooting actions on a device, by a user. The user input comprises textual input and non-textual input. The instruction causes the processor to identify an object in the device associated with the troubleshooting actions and state of the user while performing the troubleshooting actions, from the non-textual input, maps the object, identified from the non-textual input with the textual input to obtain a mapped user input. The instruction causes the processor to verify consistency of the mapped user input based on a conversation information and domain specific content associated with the device, extracts at least one of, sequence of instructions corresponding to the mapped user input, based on the state of the user and one or more similar troubleshooting actions, obtained from a knowledge database and provide troubleshooting instructions based on at least one of, the sequence of instructions and the one or more similar troubleshooting actions, to the user for real-time guidance, during troubleshooting of the device.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE ACCOMPANYING DRAWINGS

The accompanying drawings, which are incorporated in and constitute a part of this disclosure, illustrate exemplary embodiments and, together with the description, serve to explain the disclosed principles. In the figures, the left-most digit(s) of a reference number identifies the figure in which the reference number first appears. The same numbers are used throughout the figures to reference like features and components. Some embodiments of system and/or methods in accordance with embodiments of the present subject matter are now described, by way of example only, and with reference to the accompanying figures, in which:

Figure 1:
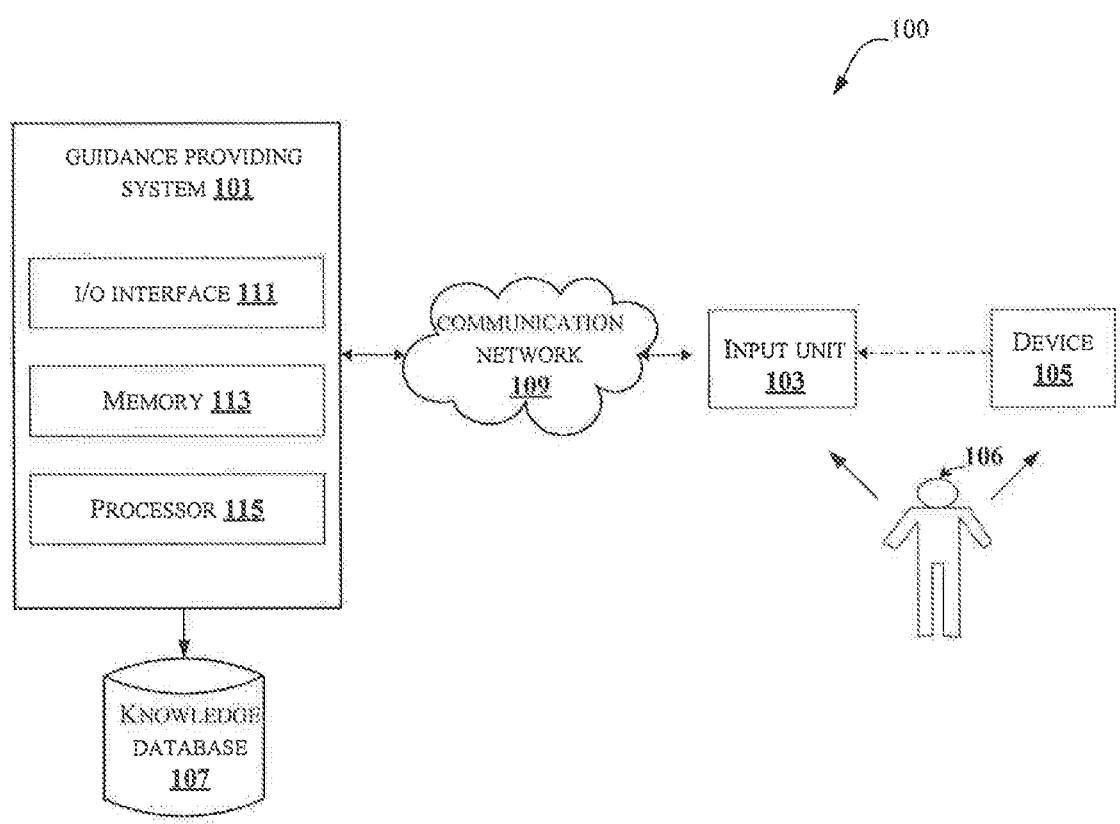
FIG. 1 illustrates an exemplary environment for providing real-time guidance to users during troubleshooting of devices in accordance with some embodiments of the present disclosure.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and executed by a computer or processor, whether or not such computer or processor is explicitly shown.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the particular forms disclosed, but on the contrary, the disclosure is to cover all modifications, equivalents, and alternative falling within the spirit and the scope of the disclosure.

The terms "comprises", "comprising", or any other variations thereof, are intended to cover a non-exclusive inclusion, such that a setup, device or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or method.

In the following detailed description of the embodiments of the disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

Embodiments of the present disclosure relates to a method and a guidance providing system for providing real-time guidance to users during troubleshooting of devices. In an embodiment, troubleshooting is a form of problem solving, often applied to repair failed products or processes on a machine or a system. The guidance providing system analyses user input representing troubleshooting actions on a user device. In an embodiment, the user input may be textual inputs and non-textual inputs. The non-textual input is analysed to identify an object in the device and a state of the user while performing the troubleshooting actions. The guidance providing system verifies consistency of the user input based on prestored domain specific content associated with the device. Thereafter, troubleshooting instructions may be provided to the user based on state of the user while performing the troubleshooting actions and experience of the user in similar situation in past. The present disclosure provides real-time guidance to users while performing troubleshooting of devices.

FIG. 1 illustrates an exemplary environment 100 for providing real-time guidance to users during troubleshooting of devices in accordance with some embodiments of the present disclosure.

As shown in FIG. 1, an environment 100 includes a guidance providing system 101 connected through a communication network 109 to an input unit 103 associated with a user 106. The guidance providing system 101 is connected to a knowledge database 107. The present disclosure may be utilized in a troubleshoot environment. Particularly, when a user 106 faces any issues with a device 105, the user 106 may troubleshoot the device 105 based on troubleshooting instructions associated with the device 105 to resolve the issues. In an embodiment, the device 105 may be an electrical equipment, electronic equipment, an electro-mechanical device and the like. A person skilled in the art would understand that the scope of the present invention may encompass any other device designed for performing a specific task, not mentioned herein explicitly. For example, the device 105 may be, television, a mixer, a grinder, a radio, a scanner, a printer, a computer system, an electric motor, a microwave oven, an air conditioner, a washing machine, a cooler and the like. The input unit 103 may be capable of receiving user input from the user 106. The input unit 103 may receive the user input associated with the device 105 of the user 106. The user input may be, but not limited to, a user query, generic statements, images, videos, actions, gestures, and the like. The user input may essentially indicate troubleshooting actions performed on the device 105, by the user 106. In an embodiment, the troubleshooting actions may refer to one or more actions performed by the user 106 based on predefined troubleshooting instructions associated with the device 105. For example, consider the user 106 is facing heating issues in an electric iron device, i.e. the electric iron device may not be heating. The user 106 may troubleshoot the electric iron device by following the troubleshooting instructions associated with the electric iron device. In such case, the troubleshooting actions by the user 106 may include checking power is "switched ON", checking electrical cord of the electric iron device and the like. In an embodiment, the input unit 103 may include textual input units and non-textual input units. In an embodiment, the textual input units may include any computing devices, but is not limited to, a laptop, a desktop computer, a Personal Digital Assistant (PDA), a notebook, a smartphone, a tablet, and any other computing devices. The textual input units may receive the textual inputs from the user 106 through speech or text. In an embodiment, the user 106 may provide the textual inputs by speaking and by typing the text on keypad of the textual input units. For example, the user 106 may write a text using smartphone to describe the issue. In an embodiment, the speech of the user 106 may be converted to text by the textual input units. In an embodiment, the non-textual input units may include sensor devices such as, a camera, a microphone, and the like. The non-textual input units may sense an environment where the user 106 may be troubleshooting the device 105 and may capture images, videos and gestures of the user 106 while executing the troubleshooting actions. A person skilled in the art would understand that, any other user devices for receiving inputs from users, not mentioned explicitly, may also be used in the present disclosure. In an embodiment, the input unit 103 may be integrated within the device 105. Further, the communication network 109 may include, but is not limited to, a direct interconnection, an e-commerce network, a Peer to Peer (P2P) network, Local Area Network (LAN), Wide Area Network (WAN), wireless network (e.g., using Wireless Application Protocol), Internet, Wi-Fi and the like. The guidance providing system 101 may analyse the user input to provide guidance to users during troubleshooting of devices. In one embodiment, the guidance providing system 101 may include, but is not limited to, a laptop, a desktop computer, a Personal Digital Assistant (PDA), a notebook, a smartphone, a tablet, a server, and any other computing devices. A person skilled in the art would understand that, any other devices, not mentioned explicitly, may also be used as the guidance providing system 101 in the present disclosure. In an embodiment, the said computing devices, along with their functionalities, may be configured to act as the guidance providing system 101. The guidance providing system 101 may include an I/O interface 111, a memory 113 and a processor 115. In another implementation, the guidance providing system 101 may be configured as a stand-alone device or may be integrated with the computing systems.

The guidance providing system 101 may receive the user input from the input unit 103, whenever the user 106 faces issues while executing troubleshooting instructions on the device 105. In an embodiment, the user input may include textual inputs and non-textual inputs. In an embodiment, the textual input may include at least one of speech data and text data associated with the troubleshooting actions performed by the user 106. In an embodiment, the non-textual input may include at least one of images, videos, actions, and gestures of the user 106 while executing the troubleshooting actions and one or more region of interest provided by the user 106 by annotating the images. The guidance providing system 101 may identify an object in the device 105 associated with the troubleshooting actions and a state of the user 106 while performing the troubleshooting actions from the non-textual input. In an embodiment, the object in the device 105 may be a component or a part of the device 105 to which the user 106 is referring for troubleshooting. In an embodiment, the state of the user 106 may be identified as normal, abnormal, rough, gentle, or the like while executing the troubleshooting actions associated with the device 105. In an embodiment, the knowledge database 107 may store a plurality of sentiments and associated troubleshooting instructions. The guidance providing system 101 may analyse the sentiments of the user 106 based on the identified state of the user 106 and retrieve corresponding troubleshooting instructions. Further, the guidance providing system 101 maps the object identified from the non-textual input with the textual input received from the textual input units to obtain a mapped user input. The guidance providing system 101 may verify consistency of the mapped user input based on a conversation information and domain specific content associated with the device 105. In an embodiment, the conversation information includes at least one of, pre-stored conversation history and response to real-time queries provided to the user 106. Further, the guidance providing system 101 extracts at least one of, sequence of instructions corresponding to the mapped user input, based on the state of the user 106 and one or more similar troubleshooting actions, obtained from the knowledge database 107. The knowledge database 107 may include troubleshooting information for a plurality of domains and one or more troubleshooting actions performed by the user 106. In an embodiment, the plurality of domains may include, but not limited to, electronic domain, mechanical domain, electrical domain, and the like. The plurality of domains in the knowledge database 107 may relate to one or more devices. The knowledge database 107 may include domain specific information associated with each of the plurality of domains. In an embodiment, the one or more similar troubleshooting actions are obtained by comparing the troubleshooting actions performed by the user 106 with one or more troubleshooting actions performed previously by the user 106 for a similar problem. For example, considering troubleshooting of similar devices in different scenarios. A user may have performed troubleshooting of a Universal Serial Bus (USB) device in a car dashboard previously and may require assistance in troubleshooting the USB device while connecting to a laptop. In such case, the one or more troubleshooting actions for the USB device may be similar in both the scenarios, i.e., the troubleshooting in car dashboard and troubleshooting in laptop.

Thereafter, the guidance providing system 101 provides the troubleshooting instructions based on at least one of, the sequence of instructions and the one or more similar troubleshooting actions, to the user 106 for real-time guidance during troubleshooting of the device 105. In an embodiment, the troubleshooting instructions may refer to a set of instructions generated for the user 106 based on the state of the user and the experience of the user in similar situation to troubleshoot the device 105.

The I/O interface 111 may be configured to receive the user input from the input unit 103. The information received from the I/O interface 111 may be stored in a memory 113. The memory 113 may be communicatively coupled to the processor 115 of the guidance providing system 101. The memory 113 may also store processor 115 instructions which may cause the processor 115 to execute the instructions for providing real-time guidance to users during troubleshooting of devices.

Figure 2:
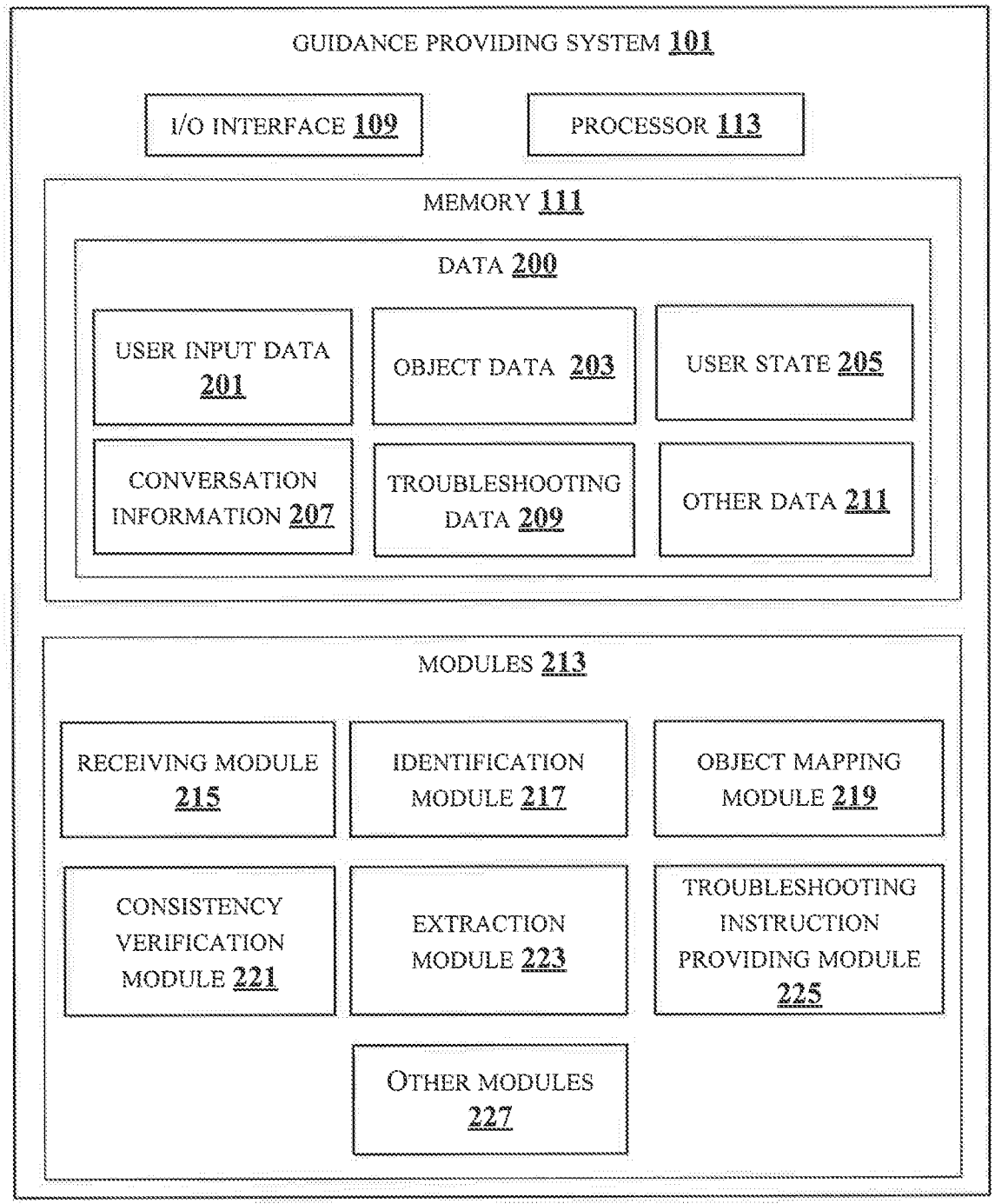
FIG. 2 shows a detailed block diagram of a guidance providing system in accordance with some embodiments of the present disclosure.

FIG. 2 shows a detailed block diagram of a guidance providing system in accordance with some embodiments of the present disclosure.

Data 200 and one or more modules 213 of the guidance providing system 101 are described herein in detail. In an embodiment, the data 200 may include user input data 201, object data 203, user state 205, conversation information 207, troubleshooting data 209 and other data 211.

The user input data 201 may include user input received from the input unit 103 indicating troubleshooting actions on the device 105. The user input may include textual input and non-textual input. The textual input may be, speech data and text data associated with the troubleshooting actions. A person skilled in the art would understand that any other data indicating textual input, not mentioned explicitly, may also be included in the present disclosure. The non-textual input may include at least one of images, videos, actions, and gestures of the user 106 while executing the troubleshooting actions and one or more region of interest provided by the user 106 by annotating the images. In an embodiment, the gestures made by the user 106 may refer to the objects in the device 105 or around the user. A person skilled in the would understand that any other non-textual input, not mentioned explicitly, may also be used in the present disclosure.

The object data 203 may include details about the object associated with the troubleshooting actions performed by the user 106. The object may be identified by analysing the non-textual input. For example, the object may be identified as a "tray" in the printer from the user images and videos. In an embodiment, the object may be identified from the textual input from the user. For example, if the textual input provided by the user is "it is difficult to pull the tray". In such case, the object may be identified as a "tray" in the printer by analysing the textual input.

The user state 205 may include details about mental and physical state of the user 106 while executing the troubleshooting actions. For example, consider a scenario where the user 106 is pulling a cable very fast or rashly or banging the door of a refrigerator. In an embodiment, the physical and mental state of the user 106 are analysed through the non-textual inputs. For example, consider the user 106 is not in a right state of mind or physical state as evident from the non-textual inputs such as the video of the user 106. The user 106 may perform unusual actions such as rash behaviour or may not follow instructions as indicated for troubleshooting the device 105. In such case, the device 105 may be damaged or incoherency may be detected between the troubleshooting instruction and the actions of the user 106. For instance, a first step of troubleshooting of the device 105 may be to pull a jammed paper from a printer, but the user 106 may perform closing side door of the printer, which may be a further step in troubleshoot, without pulling the jammed paper. In an embodiment, the state of the user 106 may be analysed from the textual input of the user 106, particularly from the speech of the user 106. For example, while providing the textual input for troubleshoot, if the user 106 speaks incoherently or out of context or with unusual emotions, the state of the user 106 may be analysed in abnormal state. In an embodiment, emotion detection technique may be used on the speech input of the user 106 to identify one or more sentiments from spoken words. For example, speaking loudly or shouting voice and the like. In an embodiment, the speech input may of the user 106 may analysed to detect one or more forbidden words. In an embodiment, a plurality of sentiments and forbidden words may be stored in the knowledge database 107. For instance, consider, the speech input as "I'll break this printer if it does not work!". In such case, the speech input may be analysed based on the plurality of sentiments and forbidden words stored in the knowledge database 107. Further, the user state 205 includes the one or more troubleshooting actions of the user 106 along with the video for each of the troubleshooting action for the device 105.

The conversation information 207 includes at least one of, pre-stored conversation history of the user with the device 105 for troubleshooting along with responses to real-time queries provided to the user 106 by the guidance providing system 101.

The troubleshooting data 209 includes troubleshooting instructions to be provided to the user 106. The troubleshooting instructions are based on at least one of the sequence of instructions identified from the knowledge database 1071 based on the state of the user 106 and the one or more similar troubleshooting actions based on the similar problem.

The other data 211 may store data, including temporary data and temporary files, generated by modules 213 for performing the various functions of the guidance providing system 101.

In an embodiment, the data 200 in the memory 113 are processed by the one or more modules 213 of the guidance providing system 101. As used herein, the term module refers to an Application Specific Integrated Circuit (ASIC), an electronic circuit, a Field-Programmable Gate Arrays (FPGA), Programmable System-on-Chip (PSoC), a combinational logic circuit, and/or other suitable components that provide the described functionality. The modules 213 when configured with the functionality defined in the present disclosure will result in a novel hardware.

In one implementation, the one or more modules 213 may include, but are not limited to, a receiving module 215, an identification module 217, an object mapping module 219, a consistency verification module 221, an extraction module 223 and a troubleshooting instruction providing module 225. The one or more modules 213 may also include other modules 227 to perform various miscellaneous functionalities of the guidance providing system 101. In an embodiment, the other modules 227 may include a clarification module, an alert generation module and a similarity detection module. The clarification module may query the user with clarification question, if the user input is not clear. The alert generation module may send alerts to the user, if an imminent danger is seen due to improper execution of any troubleshooting actions. The similarity detection module may check similarity between the troubleshooting actions executed by the user with one or more instructions stored in the knowledge database 107 based on the domain type.

The receiving module 215 may receive the user input from the input unit 103 associated with the user 106. The user input may include the textual input and the non-textual input for the device 105.

The identification module 217 may identify the object in the device associated with the troubleshooting actions performed by the user 106. In an embodiment, the object may refer to the component or part to which the user 106 is referring through the non-textual input. The identification module 217 may receive the non-textual input for the device 105 from the receiving module 215. The non-textual inputs may include images, videos, actions, and gestures of the user 106 while executing the troubleshooting actions and one or more region of interest provided by the user 106 by annotating the images. For example, if the user 106 is troubleshooting an Integrated Circuit (IC) of an electronic device and an image of the electronic device is provided as the non-textual input. In such case, the user 106 may mark the IC as the region of interest on the image and annotate the image as, "when you said remove the IC, I plucked this IC. Is it right". Further, the videos of the user 106 while executing the troubleshooting actions may be analysed and converted into one or more features. In an embodiment, the one or more features extracted from the videos may be compared with prestored feature space. For example, consider if the troubleshooting action performed by the user 106 is pulling of a printer tray. In such case, the one or more features extracted from the videos of the user 106 may be movement of hands of the user 106 related to the identified object, duration of pulling the tray, facial expression of the user 106 indicating efforts of the user 106. For instance, the facial expression of the user 106 while turning of a hand screw which is typically placed at corners of the printer, turning directions and the like. In an embodiment, similar and close looking features may be sequenced from multiple troubleshooting actions of multiple devices at multiple time instants for each action. Consider, if the textual input is "this lever is not working". The identification module 217 may analyse the image and extract what "this lever" indicates. In case, the user 106 may not do any gesture, or the captured image may not include information about the lever, the identification module 217 may trigger the clarification module to query the user 106 regarding the lever.

Further, the identification module 217 may identify the state of the user 106 while executing the troubleshooting actions. The user state 205 may include the physical and mental state of the user 106 while executing the troubleshooting actions. For example, consider a scenario where the user 106 is pulling a cable very fast or rashly or banging the door of the refrigerator during the troubleshooting process. In such case, the state of the user 106 may be identified as "agitated" or "angry" sentiment based on one or more actions and speech input of the user 106 stored under a category of "angry" sentiment in the knowledge database 107. In an embodiment, the identification module 217 may analyse the physical and mental state of the user 106 using the videos captured while executing the troubleshooting actions. In an embodiment, the video may be captured by the non-textual input unit, such as a video camera placed at surrounding of the user 106. Alternatively, the device 105 configured with the input unit 103 may capture the video. In an embodiment, the identification module 217 may analyse the state of the user 106 from the textual input of the user 106, particularly from the speech of the user 106. For example, while providing the textual input for troubleshoot, if the user 106 speaks incoherently or out of context or with unusual emotions, the state of the user 106 may be analysed in abnormal state. For instance, the mental state may include identifying, if the user 106 is in a stable state to execute the troubleshooting actions and is not deviating from a way the troubleshooting actions are supposed to be performed. For instance, in the above example, the state of the user 106 is identified to be "angry state". In such case, troubleshooting instructions may be provided to the user 106 considering the angry nature of the user 106. For instance, the troubleshooting instructions may be "pull the cable slowly and handle carefully". The state of the user 106 while executing the troubleshooting actions are analysed and stored in the user state 205 for each of the troubleshooting actions. In an embodiment, if the user 106 is not in the right state of mind or physical state, the user 106 may not be provided with further troubleshooting instructions and the user 106 may be taken to a safer state. In an embodiment, one or more safety instructions may be invoked when the user 106 may be identified in unstable physical and mental state. For example, switch off the power supply for the device 105, if it was switched on in earlier step. In addition, dialing to a human operator depending on the current situation of the troubleshooting instructions.

The object mapping module 219 may map the object identified by the identification module 217 with the textual input of the user 106. The object mapping module 219 may receive the textual input from the receiving module 215. In an embodiment, the object mapping module 219 may map the object identified from the images or gestures to the textual input of the user 106. For instance, consider the user 106 may provide speech input while troubleshooting of the device 105 is "I moved this lever". In the non-textual input, that is, a video of the user 106, the user 106 may show with hand as "this lever is mover up". In such case, the object mapping module 219 may map the "lever" in the video with the speech input. Further, the object mapping module 219 may map the lever to be of "Lever L6" type on the device 105 by comparing the lever on the video of the user 106 with domain specific details associated with the device 105 from the knowledge database 107". For instance, the domain specific details may include an internal design, topography details and design diagrams of the device 105. The object mapping module 219 may utilize the internal design, the topography details and design diagrams of the device 105 to map positions of the lever indicated in the non-textual input. The object identified from the non-textual input may be mapped with the textual input to obtain the mapped user input. For example, if the user 106 marks a circle around an Integrated Circuit (IC) on Printed Circuit Board (PCB) using a mouse/stylus and says, "This is the IC which I replaced". The object mapping module 219 may translate and map the user input as "IC OMAP is replaced" based on domain specific details from the knowledge database 107. In an embodiment, the object mapping module 219 map locate the Region of Interest (ROI) from images. In an embodiment, a trained convolution neural network may be used to map the object to the textual input. For example, when the ROI is marked with the mouse or stylus indicating the boundaries, the object within the ROI, may be considered. In case, if the user 106 shows the object with fingers, the fingers may indicate to more than one parts in the device 105. For example, if the object is shown with the finger, the user 106 may be implying the IC or the PCB. In such cases, the object mapping module 219 may trigger the clarification module to check the consistency of the user input with the consistency verification module 221. Alternatively, the object mapping module 219 may trigger the clarification module to query the user with clarification questions regarding the object.

Figure 3:
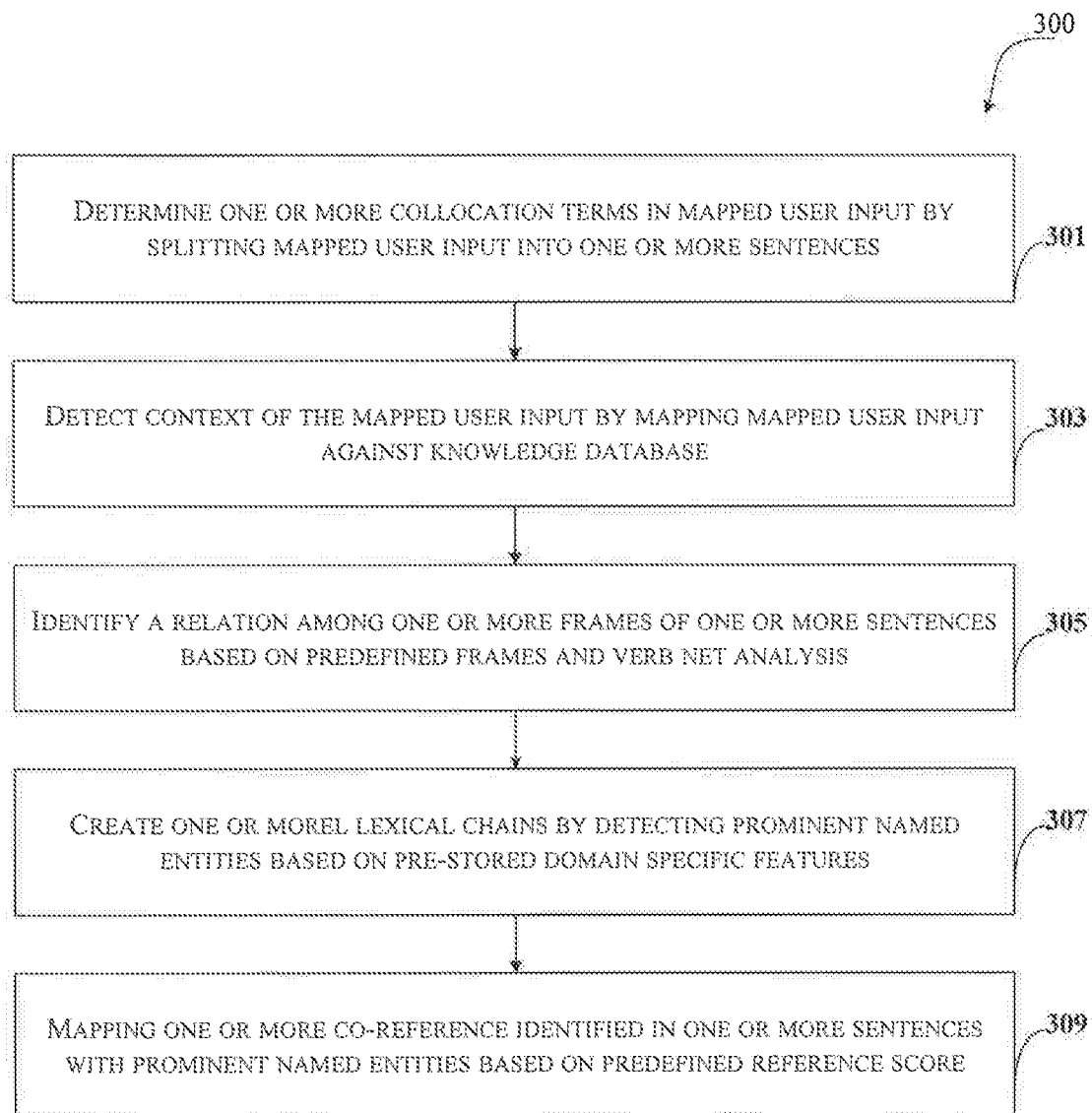
FIG. 3 shows a flowchart showing a method for verifying consistency of mapped user input in accordance with some embodiments of the present disclosure.

The consistency verification module 221 may verify the consistency of the mapped user input based on the conversation information 207 and domain specific content associated with the device 105. In an embodiment, the consistency verification module 221 may be triggered at different stages of the troubleshooting actions. For example, consider a scenario where the user input is "Have inserted Subscriber Identity Module (SIM) card and Secure Digital (SD) card, but it's not working". In this case, multiple parts/entities are inserted such as SIM card and SD card, but the user input is not clearly mentioned which part is not working. Therefore, based on the domain specific context and prior conversation history, the consistency verification module 221 may check and verify whether the issue is in the SIM card or the SD card. Consider a scenario where the user 106 may not know the exact name of the object/component. In such cases, the user 106 may express the object in relation to other nearby parts/components/objects. For instance, the user input is, "have connected the pin near power button". In this case, it may be possible that two slots may be present near the "power button" in the device 105, one to left of the power button and meant for "microphone" and other to right of the power button and used for "headphone". In such case, the consistency verification module 221 may trigger the clarification module to query the user 106 and check whether the pin is connected to the left of the power button or to the right of the power button. FIG. 3 shows a flowchart showing a method for verifying consistency of mapped user input in accordance with some embodiments of the present disclosure.

As shown in FIG. 3, at block 301, the consistency verification module 221 may determine one or more collocation terms in the mapped user input by splitting the mapped user input into one or more sentences. In an embodiment, the collocation terms may refer to terms which may co-occur and are meaningful when considered as a unit. At block 303, the consistency verification module 221 may detect the context associated with the mapped user input by mapping the mapped user input against conversation information 207 from the knowledge database 105. At block 305, the consistency verification module 221 may identify a relation among one or more frames of the one or more sentences based on predefined frames and verbNet analysis. In an embodiment, the relation identified may be sentiments/opinions. In an embodiment, the sentiments are related with each of the object identified in the sentence. For example, "screw is rotated clock-wise/anti clock-wise", negation, and co-reference resolution. For instance, in the above example, "screw" is the object which may be mapped in direction of rotation, i.e., either clock-wise/anti clock-wise. In another instance, consider the speech input is "paper is stuck in the tray". In such case, the object identified in the speech input is"paper" and "tray". Term "stuck" in the speech input provides a negative sentiment related to the object "paper". In an embodiment, negative sentiments may be identified for expressing type of problem and positive sentiments may provide information on condition of the device 105. In an embodiment, relationship among objects and corresponding sentiments may be combined to deduce overall sentiment in the speech input consisting of multiple sentences.

At block 307, the consistency verification module 221 may create one or more lexical chains by detecting prominent named entities and prestored domain specific custom features. In an embodiment, the consistency verification module 221 may create one or more lexical chains based on WordNet based polysemy extraction. For instance, in sentiment detection, opinions expressed about different features may be mapped to find an overall opinion of the feature. At block 309, the consistency verification module 221 may map one or more co-reference identified from the one or more sentences with prominent named entities based on a predefined reference score. In an embodiment, one or more types of co-references may exist, such as, pronouns and usage of different words to refer prior incidents. For example, terms such as "this", "that" and "previous" are used to refer some action mentioned previously. In an embodiment, the reference score may be calculated at the end of each sentence. In an embodiment, each conversation history may include a scope for each prominent named entity and the scope extends/expires based on the reference score. In an embodiment, the prominent named entities may be different from initial mention of the entity, frequency of entity in each sentence, and entity association score and person, number and gender mapping.

Returning to FIG. 2, in an embodiment, the consistency verification module 221 may also verify the responses for the clarification questions posed to the user 106.

The extraction module 223 may extract at least the one of sequence of instructions corresponding to the mapped user input, based on the state of the user 106 and the one or more similar troubleshooting actions, obtained from the knowledge database 107. In an embodiment, the one or more similar troubleshooting actions may be obtained by comparing the troubleshooting actions by the similarity detection module with the one or more troubleshooting actions performed previously by the user 106 for the similar problem. Based on the detection by the similarity detection module, the extraction module 223 may extract the one or more similar troubleshooting actions from the knowledge database 107.

The troubleshooting instruction providing module 225 may provide the troubleshooting instructions based on at least one of, the sequence of instructions and the one or more similar troubleshooting actions, to the user 106. For instance, based on the one or more similar troubleshooting actions, the troubleshooting instruction providing module 225 may inform the user 106 to follow similar method, as used in past for a specific device, if the user 106 is unable to proceed smoothly. In an embodiment, the execution of the troubleshooting instructions by the user 106 may be recorded to help the user 106 to record experiences of solving the problem and use it in future. In an embodiment, the one or more similar troubleshooting actions may also be useful to gauge and warn if the user 106 is anticipated to make some mistakes while executing the troubleshooting actions. For example, the user 106 may pull the cables rashly whereby they are damaged or cut. In such case, the troubleshooting instructions may be based on the one or more similar troubleshooting actions as, "You pulled the cable slowly on that day", "Please perform the same way". The troubleshooting instruction providing module 225 may modulate the sequence of instructions based on the state of the user 106. In an embodiment, the troubleshooting instruction providing module 225 may provide the troubleshooting instructions in a sequence suitable for the user 106 to perform the troubleshooting. In an embodiment, the troubleshooting instructions in form of Augmented Reality (AR) may be provided to the user 106. In an embodiment, the one or more similar troubleshooting actions may be provided to the user 106 contextually in the input unit 103. Further, the troubleshooting instruction providing module 225 may support interactivity with the user 106. For example, the user 106 may mark a Region of Interest (ROI) on the augmented image and communicate an issue.

Figure 4:
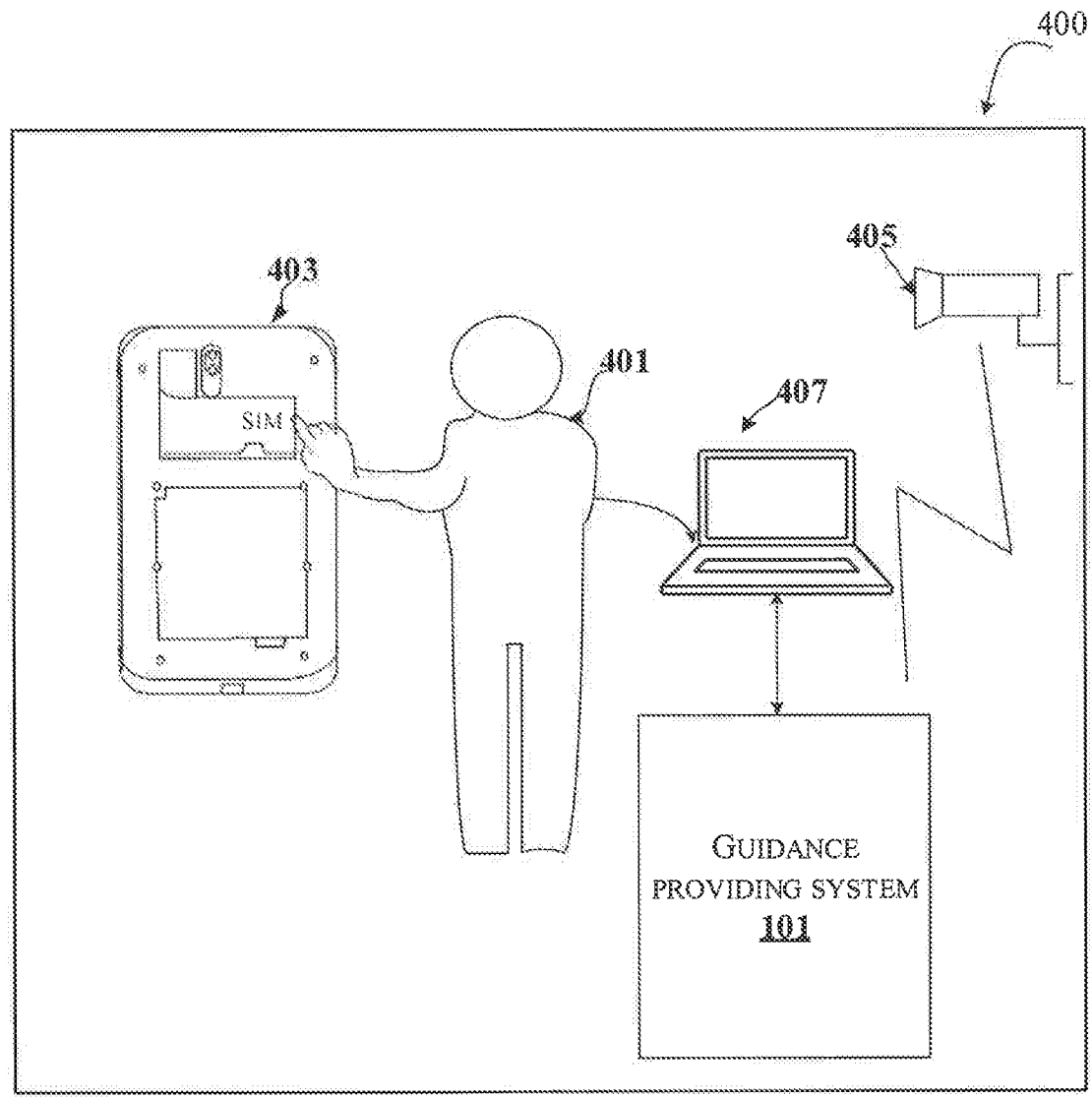
FIG. 4 show an exemplary representation for providing real-time guidance to users during troubleshooting of a printer device in accordance with some embodiments of the present disclosure.

FIG. 4 show an exemplary representation 400 for providing real-time guidance to users during troubleshooting of a mobile phone in accordance with some embodiments of the present disclosure.

Referring now to FIG. 4, an exemplary representation 400 for providing real-time guidance to users during troubleshooting of a mobile phone 403 is illustrated. The exemplary representation 400 includes a user 401 executing troubleshooting action on a mobile phone 403, the guidance providing system 101 connected to a textual input unit, i.e. a laptop 407 of the user 401 and a non-textual input unit, i.e. a video camera 405. In an embodiment, the laptop 407 and the video camera 405 may be connected to the guidance providing system 101 through a communication network. A person skilled in the art would understand that FIG. 4 is an exemplary embodiment and the present disclosure may also include other types of textual input unit and the non-textual input unit. In an embodiment, the guidance providing system 101 may be connected to the knowledge database 107 (not shown explicitly in FIG. 4). In an embodiment, the knowledge database 107 may store a plurality of sentiments and associated troubleshooting instructions. Consider, the user 401 is facing network issues on the mobile phone 403. In order to resolve the network issue, the user 401 is executing troubleshooting actions on the mobile phone 403, as shown in the FIG. 4. Particularly, the user 401 is re-inserting a Subscriber Identity Module card (SIM) associated with the mobile phone 403. However, the user 401 finds issues in dealing with the troubleshooting instructions. In such case, the user 401 may consult the guidance providing system 101. To provide troubleshooting instructions to the user 401, the guidance providing system 101 may receive the user input from the user 401 which may indicate the troubleshooting actions performed by the user 401. For instance, the user 401 may provide textual input such as, "SIM card not detected", by inputting text to the laptop 407. In an embodiment, the textual input may include at least one of speech data and text data associated with the troubleshooting actions. Further, the non-textual input such as, video of the user 401 is recorded while executing the troubleshooting action on the mobile phone 403, by the video camera 405 and provided to the guidance providing system 101. The guidance providing system 101 on receiving the user input from the laptop 407 identifies an object in the mobile phone 403 associated with the troubleshooting actions. In addition, the guidance providing system 101 may identify the state of the user 401 while executing the troubleshooting actions from the video of the user 401 recorded by the video camera 405. In the present case, the object is identified as "SIM card" of the mobile phone 403. Further, from the video of the user 401, the guidance providing system 101 analyses that the user 401 is handling the SIM card of the mobile phone 403 very roughly and inserting the SIM in anger. Thus, the guidance providing system 101 identifies the state of the user 401 as "irritated" while performing the troubleshooting action. In an embodiment, the state of the user 401 may be analysed from the textual input of the user 401, particularly from the speech of the user 401. In an embodiment, emotion detection technique may be used for the speech input of the user 401 to identify one or more sentiments from spoken words. For example, speaking loudly or shouting voice and the like. In an embodiment, visual help may be provided to the user 401 by invoking an earlier attempt by the user 401 in troubleshooting similar problems, if the user 401 is identified in unstable state of mind. In an embodiment, if the user 401 takes more time in executing troubleshooting instructions, additional details such as, micro, or detailed explanation may be provided to the user 401. Additionally, human operator may be contacted in case the user 401 is unable to proceed or follow with troubleshooting instructions. The guidance providing system 101 on identifying the object in the mobile phone 403 and state of the user 401, maps the object identified from the non-textual input with the textual input to obtain the mapped user input. In the present case, the object "SIM card" may be mapped with the speech of the user 401, "SIM card not detected". Further, the guidance providing system 101 may verify the consistency of the mapped user input based on the conversation information and domain specific content associated with the mobile phone 403. Based on the domain specific content, the guidance providing system 101 may identify from the knowledge database 107 that "due to improper placement of the SIM card, the SIM card may not be detected. Thus, the guidance providing system 101 may extract at least one of, the sequence of instructions corresponding to the mapped user input, based on the state of the user 401 and the one or more similar troubleshooting actions, obtained from the knowledge database 107. For example, the guidance providing system 101 may identify from the knowledge database that the user 401 is familiar with SD card of the mobile phone 403 and the user 401 has resolved SD card issues previously.

In an embodiment, the sequences of instructions may be specific to the mobile phone 403 domain and based on the state of the user 401. In an embodiment, the guidance providing system 101 may provide the troubleshooting instructions specifically based on the state of the user 401. In the present case, since the state of the user 401 while handling the SIM card of the mobile phone 403 is identified as "irritated", the guidance providing system 101 may retrieve troubleshooting instructions for the user 401 in "irritated" state from the knowledge database 107. For example, the troubleshooting instructions may be instructing the user 401 to handle the SIM card carefully. Further, based on the knowledge database 107, since the user 401 may be familiar with resolving SD card related issues, the guidance providing system 101 may extract one or more troubleshooting actions which may be executed by the user 401 in troubleshooting the SD card previously. Thereafter, the guidance providing system 101 may provide the troubleshooting instructions to the user 401. The troubleshooting instructions may be provided based on the sequence of instructions which may be based on the state of the user 401 and the based on the one or more similar troubleshooting actions. For instance, the one or more troubleshooting actions may be, "clean the SIM card with a piece of tissue paper or cloth. Also, insert the SIM card in the correct direction as marked in the mobile phone 403, like you performed for the SD card of your mobile phone 403.

Figure 5:
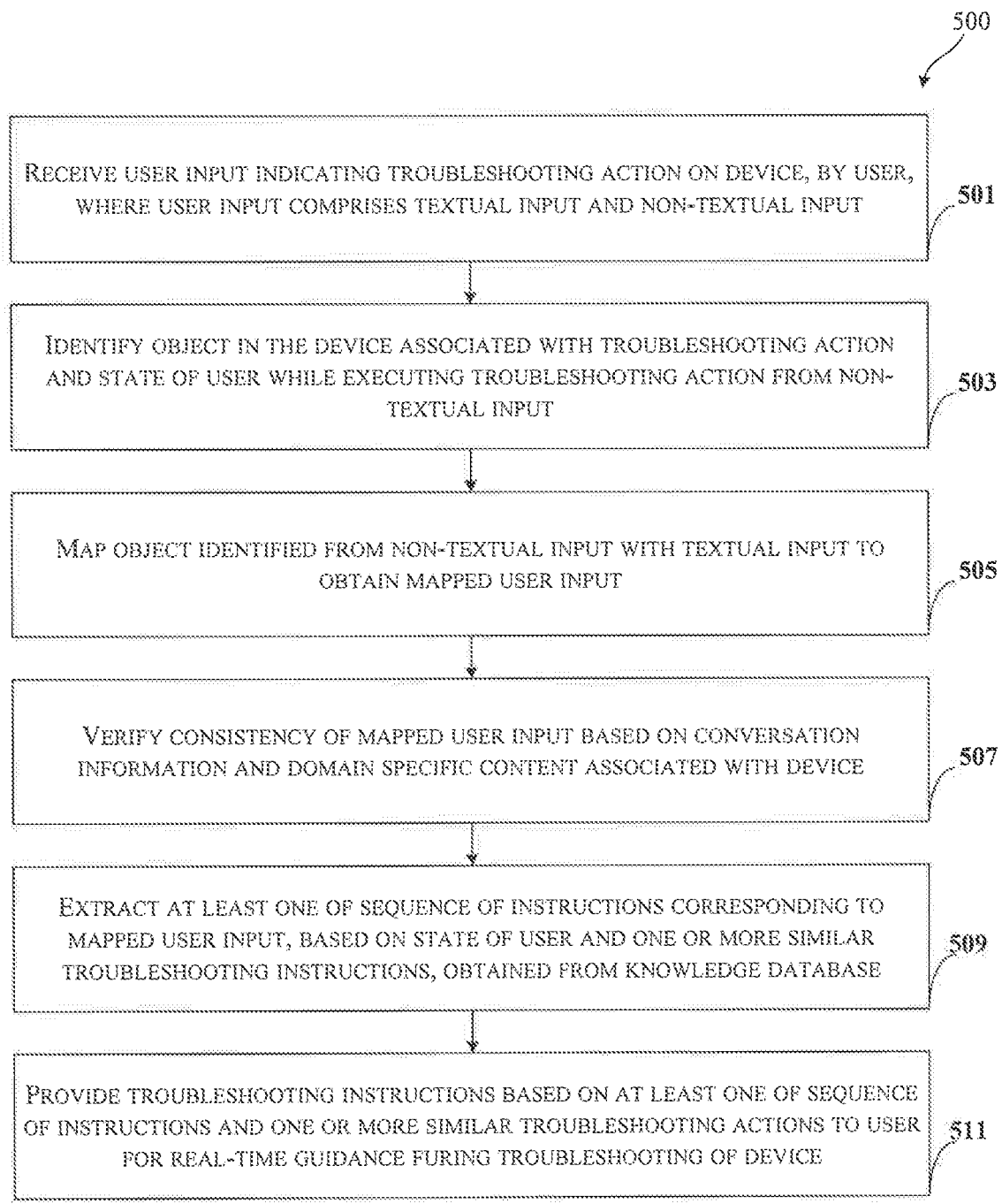
FIG. 5 illustrates a flowchart showing a method for providing real-time guidance to users during troubleshooting of devices in accordance with some embodiments of present disclosure.

FIG. 5 illustrates a flowchart showing a method for providing real-time guidance to users during troubleshooting of devices in accordance with some embodiments of present disclosure.

As illustrated in FIG. 5, the method 500 includes one or more blocks for providing real-time guidance to users during troubleshooting of devices. The method 500 may be described in the general context of computer executable instructions. Generally, computer executable instructions can include routines, programs, objects, components, data structures, procedures, modules 213, and functions, which perform particular functions or implement particular abstract data types.

The order in which the method 500 is described is not intended to be construed as a limitation, and any number of the described method blocks can be combined in any order to implement the method. Additionally, individual blocks may be deleted from the methods without departing from the spirit and scope of the subject matter described herein. Furthermore, the method can be implemented in any suitable hardware, software, firmware, or combination thereof.

At block 501, the user input indicating the troubleshooting action on the device may be received by the receiving module 215 from the user device 103. In an embodiment, the user input may include textual input and the non-textual input.

At block 503, the object in the device associated with the troubleshooting actions and state of the user while performing the troubleshooting actions is identified by the identification module 217, from the non-textual input.

At block 505, the object identified from the non-textual input may be mapped with the with the textual input by the object mapping module 219, to obtain the mapped user input.

At block 507, the consistency of the mapped user input may be verified by the consistency verification module 221, based on the conversation information 207 and the domain specific content associated with the device. In an embodiment, the conversation information 207 includes at least one of, pre-stored conversation history and response to real-time queries provided to the user.

At block 509, at least one of the sequence of instructions corresponding to the mapped user input, based on the state of the user and one or more similar troubleshooting actions may be extracted by the extraction module 223. The extraction module 223 may extract the sequence of instructions and the one or more similar troubleshooting actions from the knowledge database 105.

At block 511, the troubleshooting instructions may be provided, by the troubleshooting instruction providing module 225 to the user based on at least one of, the sequence of instructions and the one or more similar troubleshooting actions for real-time guidance during troubleshooting of the device. In an embodiment, the one or more similar troubleshooting actions are obtained by comparing the troubleshooting actions with one or more troubleshooting actions performed previously by the user for a similar problem.

Figure 6:
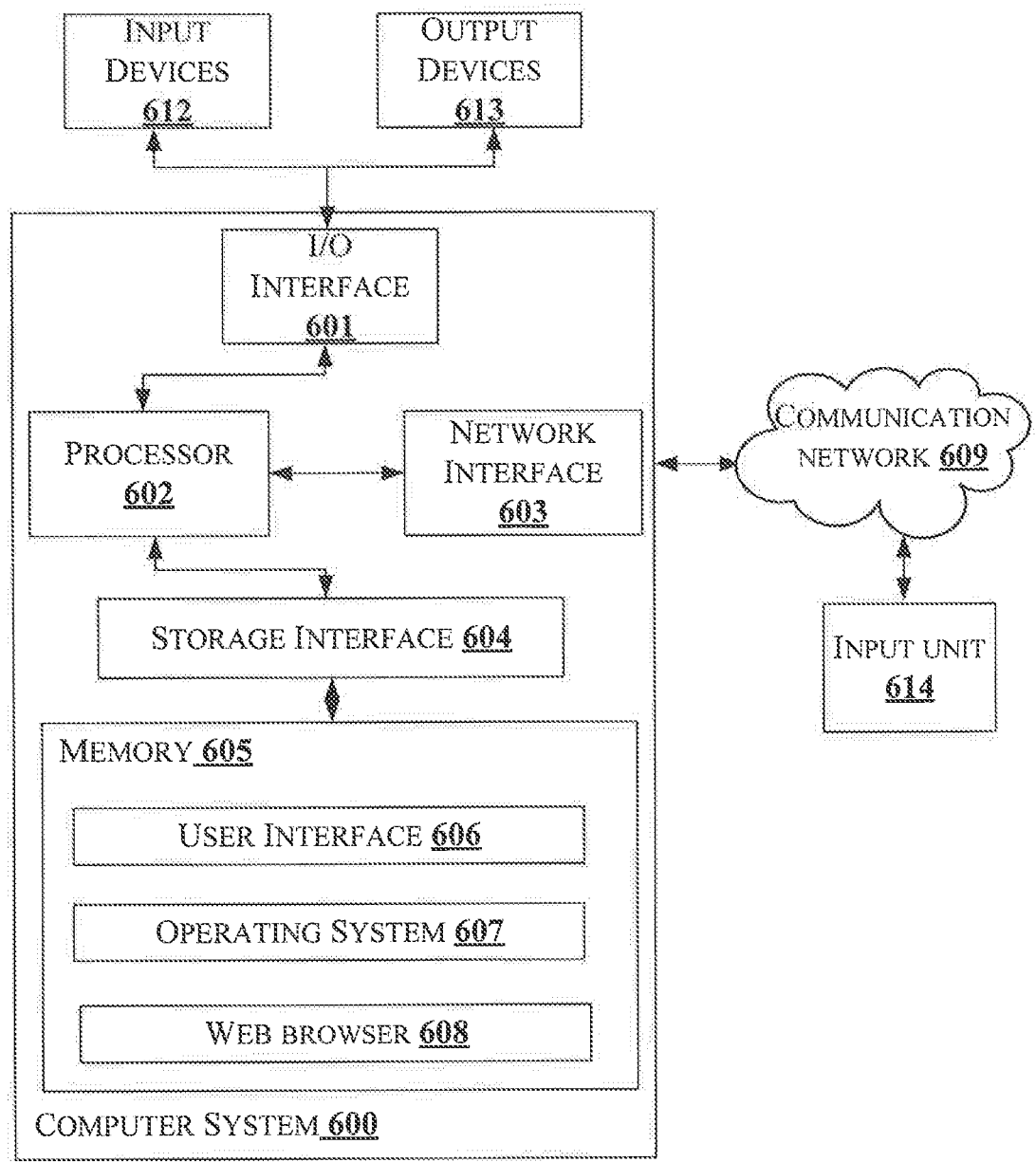
FIG. 6 illustrates a block diagram of an exemplary computer system for implementing embodiments consistent with the present disclosure.

FIG. 6 illustrates a block diagram of an exemplary computer system 600 for implementing embodiments consistent with the present disclosure. In an embodiment, the computer system 600 may be used to implement the guidance providing system 101. The computer system 600 may include a central processing unit ("CPU" or "processor") 602. The processor 602 may include at least one data processor for providing real-time guidance to users during troubleshooting of devices. The processor 602 may include specialized processing units such as, integrated system (bus) controllers, memory management control units, floating point units, graphics processing units, digital signal processing units, etc.

The processor 602 may be disposed in communication with one or more input/output (I/O) devices (not shown) via I/O interface 601. The I/O interface 601 may employ communication protocols/methods such as, without limitation, audio, analog, digital, monoaural, RCA, stereo, IEEE®-1394, serial bus, universal serial bus (USB®), infrared, PS/2, BNC, coaxial, component, composite, digital visual interface (DVI), high-definition multimedia interface (HDMI®), RF antennas, S-Video, VGA, IEEE® 802.n/b/g/n/x, Bluetooth®, cellular (e.g., code-division multiple access (CDMA), high-speed packet access (HSPA+), global system for mobile communications (GSM™), long-term evolution (LTE™), WiMax™, or the like), etc.

Using the I/O interface 601, the computer system 600 may communicate with one or more I/O devices. For example, the input device may be an antenna, keyboard, mouse, joystick, (infrared) remote control, camera, card reader, fax machine, dongle, biometric reader, microphone, touch screen, touchpad, trackball, stylus, scanner, storage device, transceiver, video device/source, etc. The output device may be a printer, fax machine, video display (e.g., cathode ray tube (CRT), liquid crystal display (LCD), light-emitting diode (LED™), plasma, Plasma display panel (PDP), Organic light-emitting diode display (OLED) or the like), audio speaker, etc.

In some embodiments, the computer system 600 consists of the guidance providing system 101. The processor 602 may be disposed in communication with the communication network 609 via a network interface 603. The network interface 603 may communicate with the communication network 609. The network interface 603 may employ connection protocols including, without limitation, direct connect, Ethernet (e.g., twisted pair 10/100/1000 Base T), transmission control protocol/internet protocol (TCP/IP), token ring, IEEE® 802.11a/b/g/n/x, etc. The communication network 609 may include, without limitation, a direct interconnection, local area network (LAN), wide area network (WAN), wireless network (e.g., using Wireless Application Protocol), the Internet, etc. Using the network interface 603 and the communication network 609, the computer system 600 may communicate with an input unit 614. The network interface 603 may employ connection protocols include, but not limited to, direct connect, Ethernet (e.g., twisted pair 10/100/1000 Base T), transmission control protocol/internet protocol (TCP/IP), token ring, IEEE® 802.11a/b/g/n/x, etc.

The communication network 609 includes, but is not limited to, a direct interconnection, an e-commerce network, a peer to peer (P2P) network, local area network (LAN), wide area network (WAN), wireless network (e.g., using Wireless Application Protocol), the Internet, Wi-Fi and such. The first network and the second network may either be a dedicated network or a shared network, which represents an association of the different types of networks that use a variety of protocols, for example, Hypertext Transfer Protocol (HTTP), Transmission Control Protocol/Internet Protocol (TCP/IP), Wireless Application Protocol (WAP), etc., to communicate with each other. Further, the first network and the second network may include a variety of network devices, including routers, bridges, servers, computing devices, storage devices, etc.

In some embodiments, the processor 602 may be disposed in communication with a memory 605 (e.g., RAM, ROM, etc. not shown in FIG. 6) via a storage interface 604. The storage interface 604 may connect to memory 605 including, without limitation, memory drives, removable disc drives, etc., employing connection protocols such as, serial advanced technology attachment (SATA®), Integrated Drive Electronics (IDE), IEEE®-1394, Universal Serial Bus (USB®), fiber channel, Small Computer Systems Interface (SCSI), etc. The memory drives may further include a drum, magnetic disc drive, magneto-optical drive, optical drive, Redundant Array of Independent Discs (RAID), solid-state memory devices, solid-state drives, etc.

The memory 605 may store a collection of program or database components, including, without limitation, user interface 606, an operating system 607 etc. In some embodiments, computer system 600 may store user/application data 606, such as, the data, variables, records, etc., as described in this disclosure. Such databases may be implemented as fault-tolerant, relational, scalable, secure databases such as Oracle or Sybase.

The operating system 607 may facilitate resource management and operation of the computer system 600. Examples of operating systems include, without limitation, APPLE MACINTOSH® OS X, UNIX®, UNIX-like system distributions (E.G., BERKELEY SOFTWARE DISTRIBUTION™ (BSD), FREEBSD™, NETBSD™, OPENBSD™, etc.), LINUX DISTRIBUTIONS™ (E.G., RED HAT™, UBUNTU™, KUBUNTU™, etc.), IBM™ OS/2, MICROSOFT™ WINDOWS™ (XP™, VISTA™/7/8, 10 etc.), APPLE® IOS™, GOOGLE® ANDROID™, BLACKBERRY® OS, or the like.

In some embodiments, the computer system 600 may implement a web browser 608 stored program component. The web browser 608 may be a hypertext viewing application, for example MICROSOFT® INTERNET EXPLORER™, GOOGLE® CHROME™, MOZILLA® FIREFOX™, APPLE® SAFARI™, etc. Secure web browsing may be provided using Secure Hypertext Transport Protocol (HTTPS), Secure Sockets Layer (SSL), Transport Layer Security (TLS), etc. Web browsers 608 may utilize facilities such as AJAX™, DHTML™, ADOBE® FLASH™, JAVASCRIPT™, JAVA™, Application Programming Interfaces (APIs), etc. In some embodiments, the computer system 600 may implement a mail server stored program component. The mail server may be an Internet mail server such as Microsoft Exchange, or the like. The mail server may utilize facilities such as ASP™, ACTIVEX™, ANSI™ C++/C #, MICROSOFT®, .NET™, CGI SCRIPTS™, JAVA™, JAVASCRIPT™, PERL™, PHP™, PYTHON™, WEBOBJECTS™, etc. The mail server may utilize communication protocols such as Internet Message Access Protocol (IMAP), Messaging Application Programming Interface (MAPI), MICROSOFT® exchange, Post Office Protocol (POP), Simple Mail Transfer Protocol (SMTP), or the like. In some embodiments, the computer system 600 may implement a mail client stored program component. The mail client may be a mail viewing application, such as APPLE® MAIL™, MICROSOFT® ENTOURAGE™, MICROSOFT® OUTLOOK™, MOZILLA® THUNDERBIRD™, etc.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include Random Access Memory (RAM), Read-Only Memory (ROM), volatile memory, non-volatile memory, hard drives, CD ROMs, DVDs, flash drives, disks, and any other known physical storage media.

An embodiment of the present disclosure may help to estimate if the user is able to execute the step on own or if expert help is anticipated.

An embodiment of the present disclosure may provide the troubleshooting instructions to users based on state of mind of the users.

An embodiment of the present disclosure ensures user would be receptive to the troubleshooting instructions by bringing analogy with similar actions performed in past, thus providing easement in executing the troubleshooting instructions.

An embodiment of the present disclosure provides adequate explanation to the user, in case of any confusion and ambiguity in the troubleshooting instructions.

The described operations may be implemented as a method, system or article of manufacture using standard programming and/or engineering techniques to produce software, firmware, hardware, or any combination thereof. The described operations may be implemented as code maintained in a "non-transitory computer readable medium", where a processor may read and execute the code from the computer readable medium. The processor is at least one of a microprocessor and a processor capable of processing and executing the queries. A non-transitory computer readable medium may include media such as magnetic storage medium (e.g., hard disk drives, floppy disks, tape, etc.), optical storage (CD-ROMs, DVDs, optical disks, etc.), volatile and non-volatile memory devices (e.g., EEPROMs, ROMs, PROMs, RAMs, DRAMs, SRAMs, Flash Memory, firmware, programmable logic, etc.), etc. Further, non-transitory computer-readable media include all computer-readable media except for a transitory. The code implementing the described operations may further be implemented in hardware logic (e.g., an integrated circuit chip, Programmable Gate Array (PGA), Application Specific Integrated Circuit (ASIC), etc.).

Still further, the code implementing the described operations may be implemented in "transmission signals", where transmission signals may propagate through space or through a transmission media, such as, an optical fiber, copper wire, etc. The transmission signals in which the code or logic is encoded may further include a wireless signal, satellite transmission, radio waves, infrared signals, Bluetooth, etc. The transmission signals in which the code or logic is encoded is capable of being transmitted by a transmitting station and received by a receiving station, where the code or logic encoded in the transmission signal may be decoded and stored in hardware or a non-transitory computer readable medium at the receiving and transmitting stations or devices. An "article of manufacture" includes non-transitory computer readable medium, hardware logic, and/or transmission signals in which code may be implemented. A device in which the code implementing the described embodiments of operations is encoded may include a computer readable medium or hardware logic. Of course, those skilled in the art will recognize that many modifications may be made to this configuration without departing from the scope of the invention, and that the article of manufacture may include suitable information bearing medium known in the art.

The terms "an embodiment", "embodiment", "embodiments", "the embodiment", "the embodiments", "one or more embodiments", "some embodiments", and "one embodiment" mean "one or more (but not all) embodiments of the invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

A description of an embodiment with several components in communication with each other does not imply that all such components are required. On the contrary, a variety of optional components are described to illustrate the wide variety of possible embodiments of the invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

The illustrated operations of FIGS. 3 and 5 show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the disclosure of the embodiments of the invention is intended to be illustrative, but not limiting, of the scope of the invention, which is set forth in the following claims.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

| Referral numerals: | |
|---|---|
| Reference Number | Description |
| 100 | Environment |
| 101 | Guidance providing system |
| 103 | User device |
| 105 | Knowledge database |
| 107 | Communication network |
| 109 | I/O interface |
| 111 | Memory |
| 113 | Processor |
| 200 | Data |
| 201 | User input data |
| 203 | Object data |
| 205 | User state |
| 207 | Conversation information |
| 209 | Troubleshooting data |
| 211 | Other data |
| 213 | Modules |
| 215 | Receiving module |
| 217 | Identification module |
| 219 | Object mapping module |
| 221 | Consistency verification module |
| 223 | Extraction module |
| 225 | Troubleshooting instruction providing module |
| 227 | Other modules |
| 401 | User |
| 403 | Mobile phone |
| 405 | Video camera |
| 407 | Laptop |
| 600 | Computer system |
| 601 | I/O interface |
| 602 | Processor |
| 603 | Network interface |
| 604 | Storage interface |
| 605 | Memory |
| 606 | User interface |
| 607 | Operating system |
| 608 | Web browser |
| 609 | Communication network |
| 612 | Input devices |
| 613 | Output devices |
| 614 | Input unit |

What is claimed is:

1. A method of providing real-time guidance to users during troubleshooting of devices, the method comprising:
  receiving, by a guidance providing system, user input indicating troubleshooting actions on a device, by a user, wherein the user input comprises textual input and non-textual input;
  identifying, by the guidance providing system, an object in the device associated with the troubleshooting actions and state of the user while performing the troubleshooting actions, from the non-textual input, wherein the object is one of a component of the device to which the user is referring for troubleshooting and the state of the user is used for analyzing sentiments of the user;
  mapping, by the guidance providing system, the object, identified from the non-textual input with the textual input to obtain a mapped user input;
  verifying, by the guidance providing system, consistency of the mapped user input based on a conversation information and domain specific content associated with the device, wherein verifying the consistency of the mapped user input comprises:
  determining, by the guidance providing system, one or more collocation terms in the mapped user input by splitting the mapped user input into one or more sentences;
  detecting, by the guidance providing system, context of the mapped user input by mapping the mapped user input against the knowledge database;
  identifying, by the guidance providing system, a relation among one or more frames of the one or more sentences based on predefined frames and VerbNet analysis;
  creating, by the guidance providing system, one or more lexical chains by detecting prominent named entities based on prestored domain specific features; and
  mapping, by the guidance providing system, one or more co-references identified in the one or more sentences with the prominent named entities based on predefined reference score;
  extracting, by the guidance providing system, at least one of, sequence of instructions corresponding to the mapped user input, based on the state of the user and one or more similar troubleshooting actions, obtained from a knowledge database; and
  providing, by the guidance providing system, troubleshooting instructions based on at least one of, the sequence of instructions and the one or more similar troubleshooting actions, to the user for real-time guidance, during troubleshooting of the device.

2. The method as claimed in claim 1, wherein the textual input comprises at least one of speech data and text data associated with the troubleshooting actions.

3. The method as claimed in claim 1, wherein the non-textual input comprises at least one of images, videos, actions, and gestures of the user while executing the troubleshooting actions and one or more region of interest provided by the user by annotating the images.

4. The method as claimed in claim 1, wherein the conversation information comprises at least one of, pre-stored conversation history and response to real-time queries provided to the user.

5. The method as claimed in claim 1, wherein the one or more similar troubleshooting actions are obtained by comparing the troubleshooting actions with one or more troubleshooting actions performed previously by the user for a similar problem.

6. The method as claimed in claim 1, wherein the knowledge database comprises troubleshooting information for a plurality of domains and one or more troubleshooting actions performed by the user.

7. A guidance providing system for providing real-time guidance to users during troubleshooting of devices, comprising:

a processor; and a memory communicatively coupled to the processor, wherein the memory stores processor instructions, which, on execution, causes the processor to:

receive user input indicating troubleshooting actions on a device, by a user, wherein the user input comprises textual input and non-textual input;

identify an object in the device associated with the troubleshooting actions and state of the user while performing the troubleshooting actions, from the non-textual input, wherein the object is one of a component of the device to which the user is referring for troubleshooting and the state of the user is used for analyzing sentiments of the user;

map the object, identified from the non-textual input, with the textual input to obtain a mapped user input;

verify consistency of the mapped user input based on a conversation information and domain specific content associated with the device, wherein the processor verifies the consistency of the mapped user input by:

determining one or more collocation terms in the mapped user input by splitting the mapped user input into one or more sentences;

detecting context of the mapped user input by mapping the mapped user input against the knowledge database;

identifying a relation among one or more frames of the one or more sentences based on predefined frames and VerbNet analysis;

creating one or more lexical chains by detecting prominent named entities based on prestored domain specific features; and mapping one or more co-references identified in the one or more sentences with the prominent named entities based on predefined reference score;

extract at least one of, sequence of instructions corresponding to the mapped user input, based on the state of the user and one or more similar troubleshooting actions, obtained from a knowledge database; and provide troubleshooting instructions based on at least one of, the sequence of instructions and the one or more similar troubleshooting actions, to the user for real-time guidance during troubleshooting of the device.

8. The guidance providing system as claimed in claim 7, wherein the textual input comprises at least one of speech and text data associated with the troubleshooting actions.

9. The guidance providing as claimed in claim 7, wherein the non-textual input comprises at least one of images, videos, actions, and gestures of the user while executing the troubleshooting actions and one or more region of interest provided by the user by annotating the images.

10. The guidance providing system as claimed in claim 7, wherein the conversation information comprises at least one of, pre-stored conversation history and response to real-time queries provided to the user.

11. The guidance providing system as claimed in claim 7, wherein the processor obtains the one or more similar troubleshooting actions by comparing the troubleshooting actions with one or more troubleshooting actions performed previously by the user for a similar problem.

12. The guidance providing system as claimed in claim 7, wherein the knowledge database comprises troubleshooting information for a plurality of domains and one or more troubleshooting actions performed by the user.

13. A non-transitory computer readable medium including instruction stored thereon that when processed by at least one processor cause a guidance providing system to perform operation comprising:

receiving user input indicating troubleshooting actions on a device, by a user, wherein the user input comprises textual input and non-textual input;

identifying an object in the device associated with the troubleshooting actions and state of the user while performing the troubleshooting actions, from the non-textual input, wherein the object is one of a component of the device to which the user is referring for troubleshooting and the state of the user is used for analyzing sentiments of the user;

mapping the object, identified from the non-textual input with the textual input to obtain a mapped user input;

verifying consistency of the mapped user input based on a conversation information and domain specific content associated with the device, wherein verifying the consistency of the mapped user input comprises:

determining one or more collocation terms in the mapped user input by splitting the mapped user input into one or more sentences;

detecting context of the mapped user input by mapping the mapped user input against the knowledge database;

identifying a relation among one or more frames of the one or more sentences based on predefined frames and VerbNet analysis;

creating one or more lexical chains by detecting prominent named entities based on prestored domain specific features; and mapping one or more co-references identified in the one or more sentences with the prominent named entities based on predefined reference score;

extracting at least one of, sequence of instructions corresponding to the mapped user input, based on the state of the user and one or more similar troubleshooting actions, obtained from a knowledge database; and providing troubleshooting instructions based on at least one of, the sequence of instructions and the one or more similar troubleshooting actions, to the user for real-time guidance, during troubleshooting of the device.

14. The medium as claimed in claim 13, wherein the textual input comprises at least one of speech data and text data associated with the troubleshooting actions.

15. The medium as claimed in claim 13, wherein the non-textual input comprises at least one of images, videos, actions, and gestures of the user while executing the troubleshooting actions and one or more region of interest provided by the user by annotating the images.

16. The medium as claimed in claim 13, wherein the conversation information comprises at least one of, pre-stored conversation history and response to real-time queries provided to the user.

17. The medium as claimed in claim 13, wherein the instruction causes the processor to obtain the one or more similar troubleshooting actions by comparing the troubleshooting actions with one or more troubleshooting actions performed previously by the user for a similar problem.

18. The medium as claimed in claim 13, wherein the knowledge database comprises troubleshooting information for a plurality of domains and one or more troubleshooting actions performed by the user.

* * * * *